May 12, 1936. E. G. SHINNER 2,040,276
INSECT TRAP AND LAMP
Filed March 16, 1935 2 Sheets-Sheet 1
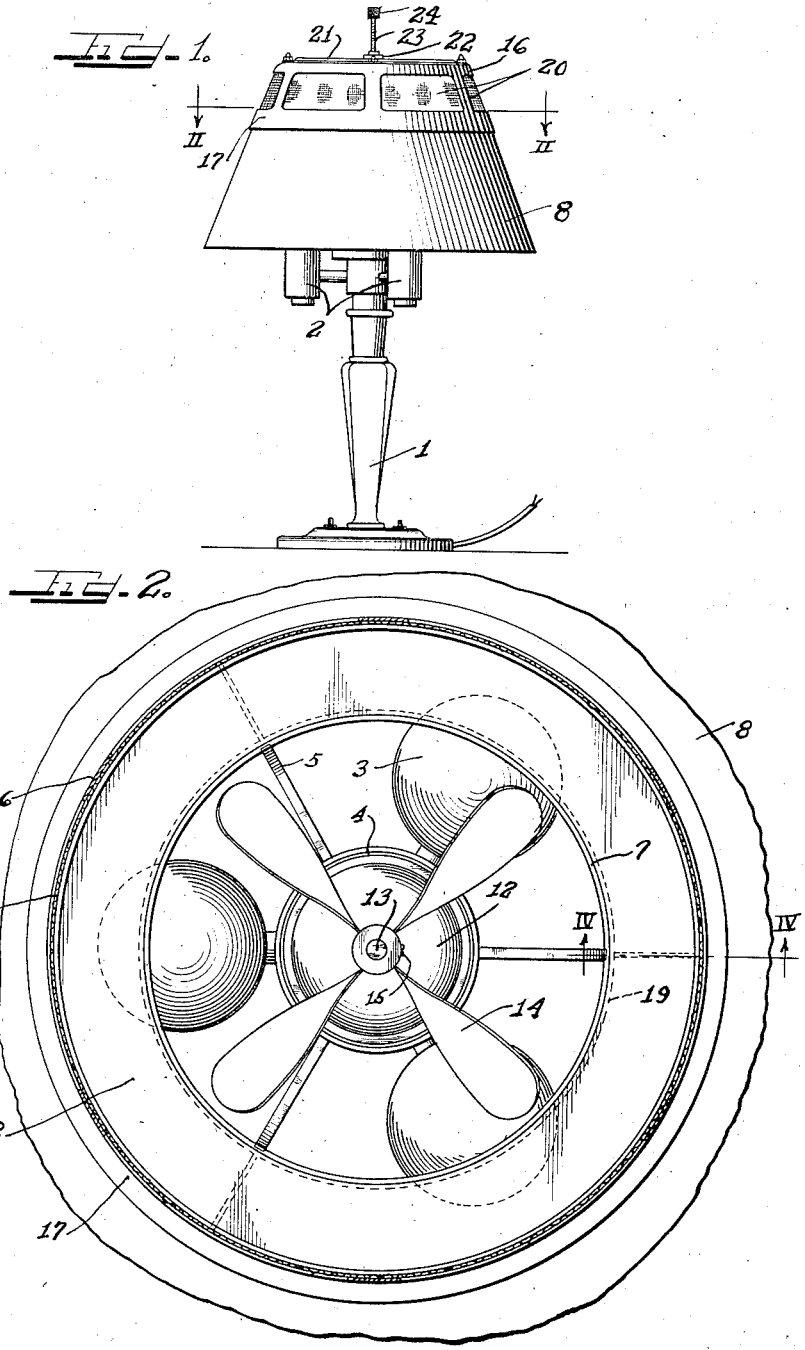

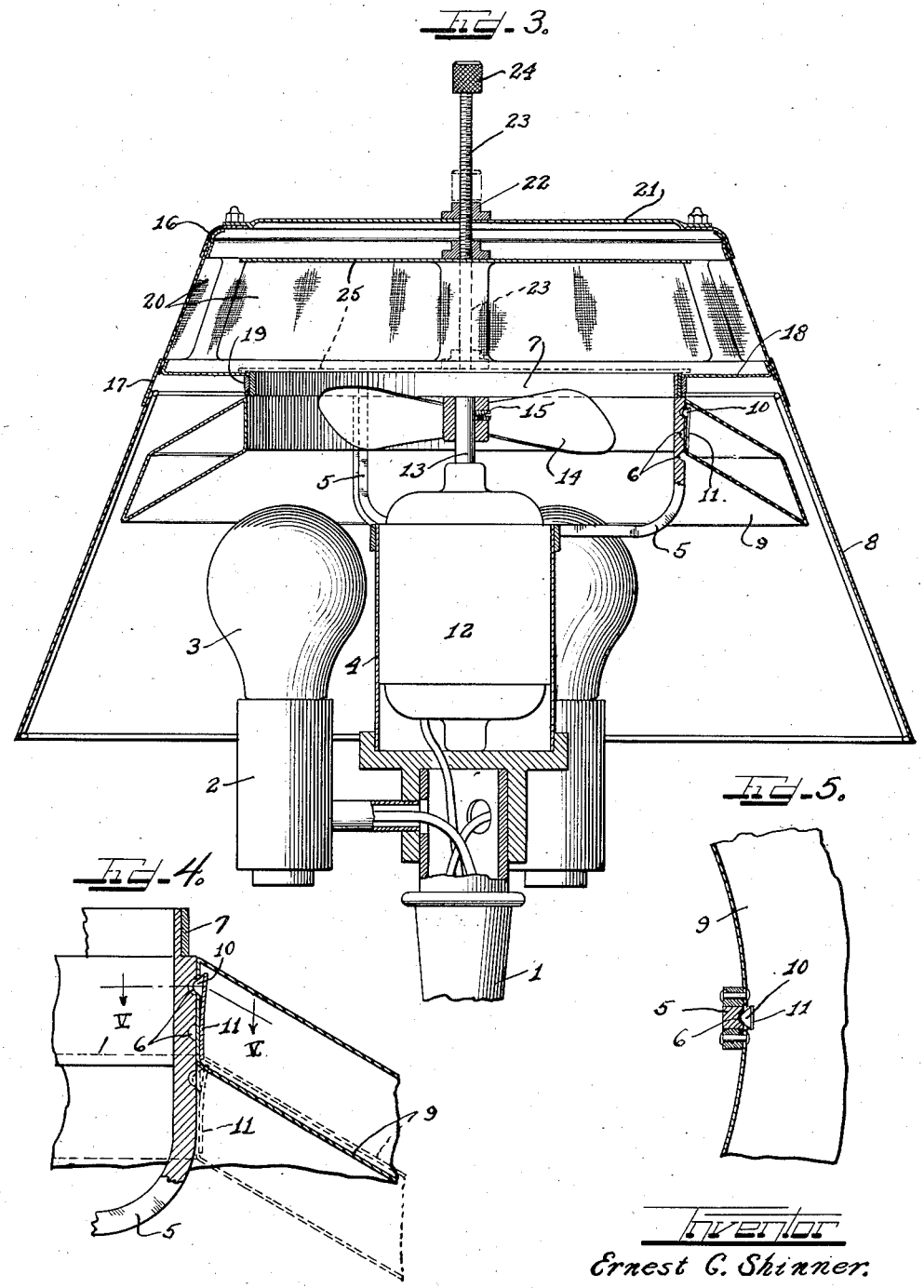

Patented May 12, 1936

2,040,276

UNITED STATES PATENT OFFICE 2,040,276

INSECT TRAP AND LAMP

Ernest G. Shinner, Chicago, Ill.

Application March 16, 1935, Serial No. 11,427

8 Claims. (Cl. 43—139)

The present invention relates more particularly to a combination insect trap and lamp wherein insects attracted by the light from the lamp are forcibly drawn into air currents produced by an electric fan and are carried through an opening into a removable screened trap housing engaged on the top of the lamp shade and containing a manually adjustable valve disc adapted for closing the entrance to the trap housing to prevent the escape of the entrapped insects when it is desired to remove the trap housing for the purpose of emptying same.

It is an object of this invention to provide an improved insect trap and lamp including in combination an insect attracting means and an insect trap housing into which insects are adapted to be forced by means of an electric fan adapted to produce an up-draft through the lamp and trap, and when the trap valve is closed, adapted to cause an outwardly directed down draft in the lamp shade with the aid of an adjustable hollow baffle or shield.

It is a further object of this invention to provide a combination insect trap and lamp including a fan having associated therewith a shiftable conical deflector or shield adapted when in its lowermost position with the trap closed to cause the fan to produce an outwardly directed down-draft in the lamp, or an up-draft through the lamp and the trap when the trap valve is open and the conical deflector is in its uppermost position.

It is an important object of this invention to provide an improved insect trap and lamp including an electric fan, a removable trap housing including a closure valve, and a shiftable baffle within the lamp shade and surrounding the fan, said baffle serving the double purpose of acting when in its uppermost position as a means for obviating dead air pockets in the lamp shade when the trap is in use, and furthermore serving when in its lower position with the valve closed, as a means for causing a diverted down-draft in the lamp shade to distribute cool air over a wide area.

Other and further important objects of this invention will be apparent from the disclosures in the specification and the accompanying drawings.

The invention, in a preferred form, is illustrated in the drawings and hereinafter more fully described.

On the drawings:

Figure 1 is an elevational view of a combined insect trap and lamp embodying the principles of this invention.

Figure 2 is an enlarged horizontal section taken on line II—II of Figure 1, with parts of the lamp shade broken away.

Figure 3 is an enlarged central vertical section of the combined insect trap and lamp with parts shown in elevation and with the lamp base broken away.

Figure 4 is an enlarged fragmentary vertical detailed section taken on line IV—IV of Figure 2.

Figure 5 is an enlarged fragmentary detailed section taken on line V—V of Figure 4.

As shown on the drawings:

The combined insect trap and lamp of this invention comprises a lamp base or standard 1 having lamp sockets 2 supported near the upper end thereof for the reception of light bulbs 3. Supported upon the upper end of the standard 1 is a cylindrical casing or sleeve 4 having a plurality of spaced angle brackets 5 secured thereto. The angle brackets 5 project outwardly and then upwardly with the upwardly projecting arms thereof having a row or plurality of locking indents or notches 6 provided in the outer surfaces thereof. The upper ends of the bracket arms 5 are notched to receive the supporting ring 7 of a lamp shade 8 seated thereon. Shiftably mounted within the lamp shade 8 is a hollow conical shield or baffle 9. The inner wall of the shield 9 is provided with openings through which latching detents or pins 10 project to seat in the notches 6. The detents 10 are mounted on spring fingers 11 supported within the hollow shield 9. The spring latching means within the hollow shield 9 permit the shield to be shifted vertically on the upright arms of the brackets 5 from the upper full line position of Figure 4 to the lowermost dotted line position of said figure, or into an intermediate position if desired. With the upward and downward movement of the shield 9, the spring controlled latching members 10 are adapted to snap into and out of the notches 6 in the bracket arms 5.

Mounted within the cylindrical housing or casing 4 on the top of the lamp standard 1 is an electric driving motor 12 which is mounted in a vertical position with its driving shaft 13 projecting upwardly. Supported on the driving shaft 13 is a fan 14 held in position by means of a set screw 15 or the like. The fan when rotating will cause an upward draft through the lamp which serves as a cooling medium for the lamps 3 tending to prolong the life of the lamps.

Removably engaged on the upper end of the lamp shade 8 is an insect trap comprising a housing or dome 16 including a base ring 17 adapted when in position to overlap the upper marginal edge of the lamp shade as clearly illustrated in Figure 3. The trap housing 16 is provided with a ring bottom or base 18 on the inner periphery of which is integrally formed or rigidly secured a supporting ring 19 which fits around the ring 7 supported on the upper end of the brackets 5. When in position, as illustrated in Figure 3, the trap housing has the open portion of the bottom thereof communicating with the chamber or space surrounding the fan 14. The trap housing 16 is provided with a plurality of spaced openings which are closed by means of screens 20. The top of the trap housing is closed by means of a removable top disc or plate 21 having secured centrally thereon an internally threaded bushing or boss 22 through which a threaded valve stem 23 projects. The upper end of the threaded valve stem or screw shaft 23 is provided with a knurled head or nut 24 to facilitate rotation of the valve stem to cause raising or lowering of a valve disc or plate 25 supported on the lower or inner end of the screw stem 23. The valve plate 25 which is disposed within the trap housing 16 may be lowered into the dotted line position of Figure 3 to seat upon the bottom 18 thereby closing the bottom entrance into the trap housing 16. When the valve plate is in its closed position the insect trap housing 16 may be removed from the lamp shade to permit the insects entrapped in the cage to be emptied out through the bottom of the housing when the valve plate 25 is opened.

In the assembled form of the combined insect trap and lamp as illustrated in Figure 1, the trap unit is supported on the upper end of the lamp shade and the valve 25 is in its raised or open position as illustrated in Figure 3. When it is desired to trap insects, the lights 3 are turned on and the motor is set in operation to cause rotation of the fan 14. The light attracts the insects into the open bottom of the lamp shade 8 into the path of the upward draft caused by the rotation of the fan. The upward draft or current of air through the lamp shade continues upwardly into the trap housing 16 and out of the trap screens 20. The insects attracted into the lamp shade are thus caught in the upward current of air and are carried or impelled by force upwardly through the ring 7 and into the trap housing 16.

When the trap is full of insects or when it is desired to empty the trap, the valve plate or disc 25 is moved downwardly by rotation of the screw stem 23 until the valve plate rests upon the bottom 18 of the trap housing to close the trap. The motor may now be stopped and the lights turned out after which the closed trap housing 16 is removed from the lamp shade. After the removal of the trap housing the valve may be opened to permit emptying of the contents of the trap.

Attention is called to the adjustable hollow shield or baffle 9 in the lamp shade 8. The shield, when in its uppermost position as illustrated in Figure 3 contacts the ring 19 and is made hollow to fill the major portion of the dead air space usually encountered in the upper corners of the lamp shade below the bottom 18 of the trap. The conical shape of the bottom wall of the shield 9 serves as a guide for directing the insects upwardly into the trap and also serves as a means for causing an upward draft or current of air through substantially the entire lower portion of the lamp shade and prevents the attracted insects from getting into the dead air spaces above the shield. Should it be desired to cause a downward draft of cool air by the fan through the lamp shade, it is only necessary to lower the valve plate 25 to close the trap opening. The motor may now be started to cause rotation of the fan 14, causing an upward flow of air in the lamp shade. The air contacts the bottom face of the valve plate and is diverted outwardly. When the valve is closed the baffle or shield 9 is pulled downwardly to leave an escape space for the diverted air. The air is thus permitted to flow outwardly over the top of the conical shield which directs the air downwardly against the inner surface of the lamp shade 8 so that the cool air from the fan is distributed outwardly over a large area. When the shield 9 is lowered the spring controlled latch means 10 co-acting with the notches 6 serve to hold the shield 9 in any of its adjusted positions. The shield 9 may be lowered into different positions to control the discharge of cool air from the fan outwardly from the bottom of the lamp shade.

It will thus be noted that an upward flow of cool air from the fan may be caused through the lamp shade and the trap housing when the valve 25 is in an open position and that a downward flow of cool air from the fan may be produced by closing the valve and adjusting the baffle or shield 9.

It will, of course, be understood that various details of construction may be varied through a wide range without departing from the principles of this invention, and it is therefore not the purpose to limit the patent granted hereon otherwise than necessitated by the scope of the appended claims.

I claim as my invention:

1. As an article of manufacture a combined insect trap and lamp comprising in combination a light source, a shade thereover, an insect trap seated on said shade, a valve in said trap, a valve stem projecting through the top of the trap for raising and lowering the valve, and a fan in the shade for causing an upward flow of air through the shade and trap when the valve is open and a downward flow of air from the shade when the valve is closed.

2. As an article of manufacture a combined insect trap and lamp comprising in combination a light source, a shade thereover, an insect trap seated on said shade, a valve in said trap, means for operating the valve, a fan in the shade for causing an upward draft of air through the shade and trap when the valve is open, and a shiftable shield in the shade adapted when lowered to permit a draft of air thereover and downwardly in the shade when the valve is closed.

3. The combination with a lamp including a shade, trap means for closing the top of the shade, a motor in the shade, a fan in the shade operable by the motor, and a shield means in the shade vertically adjustable with respect to the fan for defining the path of discharge of air currents produced by the fan.

4. The combination with a lamp including a shade, trap means for closing the top of the shade, a motor in the shade, a fan in the shade operable by the motor, a shield means vertically shiftable in the shade for defining the path of discharge of air currents produced by the fan, and latching means for holding the shield means in a set position.

5. An insect attracting and trapping device comprising a trap, means for controlling the entrance into the trap, means for attracting insects into the device, means for inducing the insects by force to enter the trap, and a shield means movably mounted in the device and adapted to be lowered to permit a discharge of air thereover when the control means closes the trap entrance.

6. An insect trap and lamp device including a lamp shade, a trap housing thereon, means for attracting insects into the shade, a fan means for inducing a draft through the shade to carry insects into the trap, and a hollow shield in the shade surrounding the fan means to fill in the space in the upper portion of the shade and serve as a guide for insuring the entrance of the insects into the trap.

7. An insect attracting and trapping device comprising a lamp, a trap housing removably mounted thereon and having an entrance opening therein, a valve in the trap housing, a screw stem for adjusting the valve, a fan mechanism in the lamp to produce air circulation through the trap, a hollow conical shield in the lamp for filling up space in the upper portion of the lamp, and resilient latching means for holding the shield in place.

8. In a trap device of the class described the combination with a lamp shade and a trap housing having an entrance opening therein, of a valve member in the housing, a screw stem connected therewith and operable from the exterior of the trap housing for moving the valve member into position to close the trap entrance opening, a fan mechanism for inducing a draft through the trap housing when the valve member is retracted from the opening, and a conical guide communicating with the trap opening to form a mouth piece for the trap housing and also act as a shield around the fan mechanism to divert the air currents from the fan over the guide and downwardly along the inner surface of the lamp shade when the valve member is closed.

ERNEST G. SHINNER.